(12) United States Patent
Stallings et al.

(10) Patent No.: US 9,645,705 B2
(45) Date of Patent: May 9, 2017

(54) APPLICATION USER INTERFACE SYSTEMS AND METHODS

(71) Applicant: Verizon Patent and Licensing Inc., Arlington, VA (US)

(72) Inventors: Heath Stallings, Colleyville, TX (US); Nathan J. Maxfield, Wakefield, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 223 days.

(21) Appl. No.: 13/732,090

(22) Filed: Dec. 31, 2012

(65) Prior Publication Data

US 2014/0189574 A1 Jul. 3, 2014

(51) Int. Cl.
*G06F 3/048* (2013.01)
*G06F 3/0482* (2013.01)

(52) U.S. Cl.
CPC .................................. *G06F 3/0482* (2013.01)

(58) Field of Classification Search
CPC ................................ G06F 13/00; G06F 3/048
USPC .......................................................... 725/37
See application file for complete search history.

(56) References Cited

U.S. PATENT DOCUMENTS

| | | | | |
|---|---|---|---|---|
| 8,856,675 | B1 * | 10/2014 | Agarawala | G06F 3/048 715/777 |
| 2006/0236349 | A1 * | 10/2006 | Lee | 725/80 |
| 2008/0307350 | A1 * | 12/2008 | Sabatelli et al. | 715/779 |
| 2010/0087230 | A1 * | 4/2010 | Peh | G06F 3/04817 455/566 |
| 2010/0222046 | A1 * | 9/2010 | Cumming | 455/418 |
| 2012/0060123 | A1 * | 3/2012 | Smith | 715/833 |
| 2014/0095692 | A1 * | 4/2014 | Anderson | H04L 67/22 709/224 |

OTHER PUBLICATIONS http://windows.microsoft.com/en-us/windows7/help/better-stronger-faster-the-windows-7-taskbar Peter "the new windows 7 taskbar", Aug. 2, 2009.*
Tuuli Hyvärinen, et al. "Placing Links in Mobile Banking Application" (Published in: Proceeding MobileHCI'05 proceedings of the 7th international conference on human computer interaction with mobile devices & services, p. 63-68, ISBN: 1-59593-089-2).*

* cited by examiner

*Primary Examiner* — Xuyang Xia

(57) ABSTRACT

An exemplary method includes a user computing device 1) executing a software application having primary, secondary, and tertiary menu levels, and 2) providing, for display as directed by the software application, a graphical user interface view that includes a first navigation control section in the form of a footer bar mapped to the primary menu level, a second navigation control section in the form of a header bar mapped to the secondary menu level, and a third navigation control section positioned between the footer bar and the header bar and mapped to the tertiary menu level. In some embodiments, the footer bar includes a slidable segment associated with selectable menu options included in a primary menu level application menu, and a fixed segment associated with a persistent selectable link to an additional software application included in a suite of software applications. Corresponding methods and systems are also disclosed.

19 Claims, 14 Drawing Sheets

APPLICATION USER INTERFACE SYSTEMS AND METHODS

BACKGROUND INFORMATION

Advances in computing technologies have provided users of computing devices with access to a variety of computing tools. To illustrate, increased capabilities of computing devices such as mobile smart phones and tablet computers have allowed users of the devices to access and use a variety of software applications that have been developed for the computing devices. As such devices have become popular, an increased number of software applications (e.g., software applications commonly referred to as "mobile apps" or "apps") have been developed and made available to users of the devices.

Such advances in computing technologies have challenged designers of user interfaces for computing devices such as mobile smart phones and tablet computers. A common challenge has been to design and implement user interfaces that provide an appropriate balance of information, usability, intuitiveness, control, and functionality that promotes a quality user experience. While user interface technologies have made significant advances in this regard, there remains room for improvement. For instance, there remains room to improve the intuitiveness, convenience, flexibility, and/or usability of user interfaces that are designed to be used by a user of a mobile computing device to control, access, navigate, or otherwise manage or use software applications running on the computing device.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary application user interface systems and methods are disclosed herein. The exemplary systems and methods described herein may provide one or more application user interfaces configured to facilitate user interaction with one or more software applications (e.g., software applications included in a suite of software applications) executing on or otherwise being accessed by a user computing device.

In certain embodiments, an application user interface provided by the exemplary systems and methods described herein may include a graphical user interface ("GUI") that is provided by a user computing device for display as directed by a software application being executed by the user computing device. The GUI may provide a user of the user computing device with one or more user interface elements configured to facilitate convenient, intuitive, and/or user-friendly navigation within the software application and/or across software applications included in a suite of software applications. Within a context of a suite of software applications, each software application may be configured to direct a computing device to provide a GUI, and the set of GUIs provided by the software applications included in the suite may be uniform in that the GUIs may provide consistent user interface frameworks, element layouts, menu displays, etc. that are configured to facilitate a uniform, intuitive, convenient, and/or user-friendly user experience across the suite of software applications, including in any of the ways described herein.

These and/or other features and benefits that may be provided by the disclosed exemplary systems and methods will be made apparent herein. Examples of application user interface systems and methods, as well as examples of a GUI framework and GUI views provided by the systems and methods will now be described in reference to the accompanying drawings.

Figure 1:
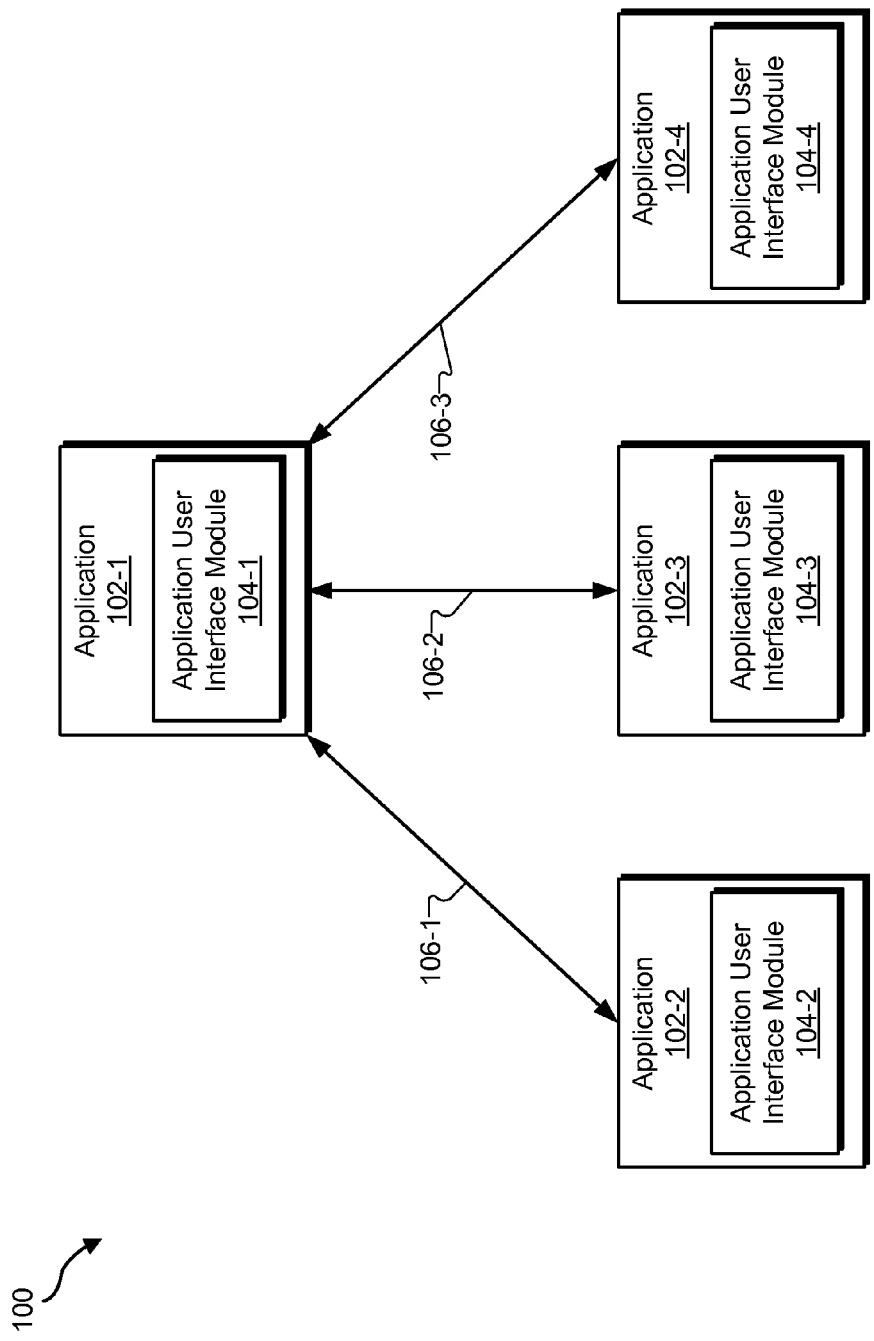
FIG. 1 illustrates an exemplary suite of discrete software applications according to principles described herein.

FIG. 1 illustrates an exemplary suite 100 of discrete software applications 102 (e.g., software applications 102-1, 102-2, 102-3, and 102-4) that include application user interface modules 104 (e.g., application user interface modules 104-1, 104-2, 104-3, and 104-4, respectively) integrated therein. Software applications 102 may be discrete in that each software application 102 may be independently accessed by a user computing device, which access may include the user computing device downloading, installing, and/or executing each software application 102.

Software applications 102 may be a suite of software applications for one or more reasons. For example, software applications 102 may be a suite in that the software applications 102 are developed by a single developer such as a provider of media content and/or communications services. As another example, software applications 102 may be a suite in that software applications 102 are configured to communicate one with another and/or to seamlessly exchange data one with another. As another example, software applications 102 may be a suite in that each software application 102 implements functionality for linking to one or more of the other software applications 102 in the suite. As another example, applications 102 may be a suite in that the software applications 102 implement functionality for providing uniform user interfaces that share attributes (e.g., layout, framework, functionality, etc.) configured to facilitate a consistent user experience across the suite of software applications 102.

In certain examples, software applications 102 included in suite 100 may be organized relative to one another such that one of the software applications 102 in suite 100 is an "umbrella" application configured to provide links to the other software applications 102 included in suite 100. The other software applications 102 in suite 100 may be referred to as "destination" applications and may provide links back to the "umbrella" application.

For example, "umbrella" software application 102-1 may provide links to "destination" software applications 102-2, 102-3, and 102-4, which may provide links back to "umbrella" software application 102-1. The links between software application 102-1 and software applications 102-2, 102-3, and 102-4 are represented by arrows 106-1, 106-2, and 106-3, respectively, in FIG. 1. Software applications 102 may employ any suitable technologies for linking one to another.

In certain examples, software applications 102 included in suite 100 may be provided (e.g., developed and/or published) by a single service provider. For example, a service provider that provides one or more services, such as, but not limited to, a media delivery service (e.g., a video-on-demand service, a linear television service, a subscription media service such as a subscriber television service), a home monitoring and control service, a cloud-based data storage service, a subscription account management service, one or more communications services (e.g., a short messaging service, a media messaging service, a voice call service, an e-mail service, a voicemail service, a chat service, etc.), or any packaged combination or sub-combination thereof may provide the software applications in relation to one or more of the services.

Figure 2:
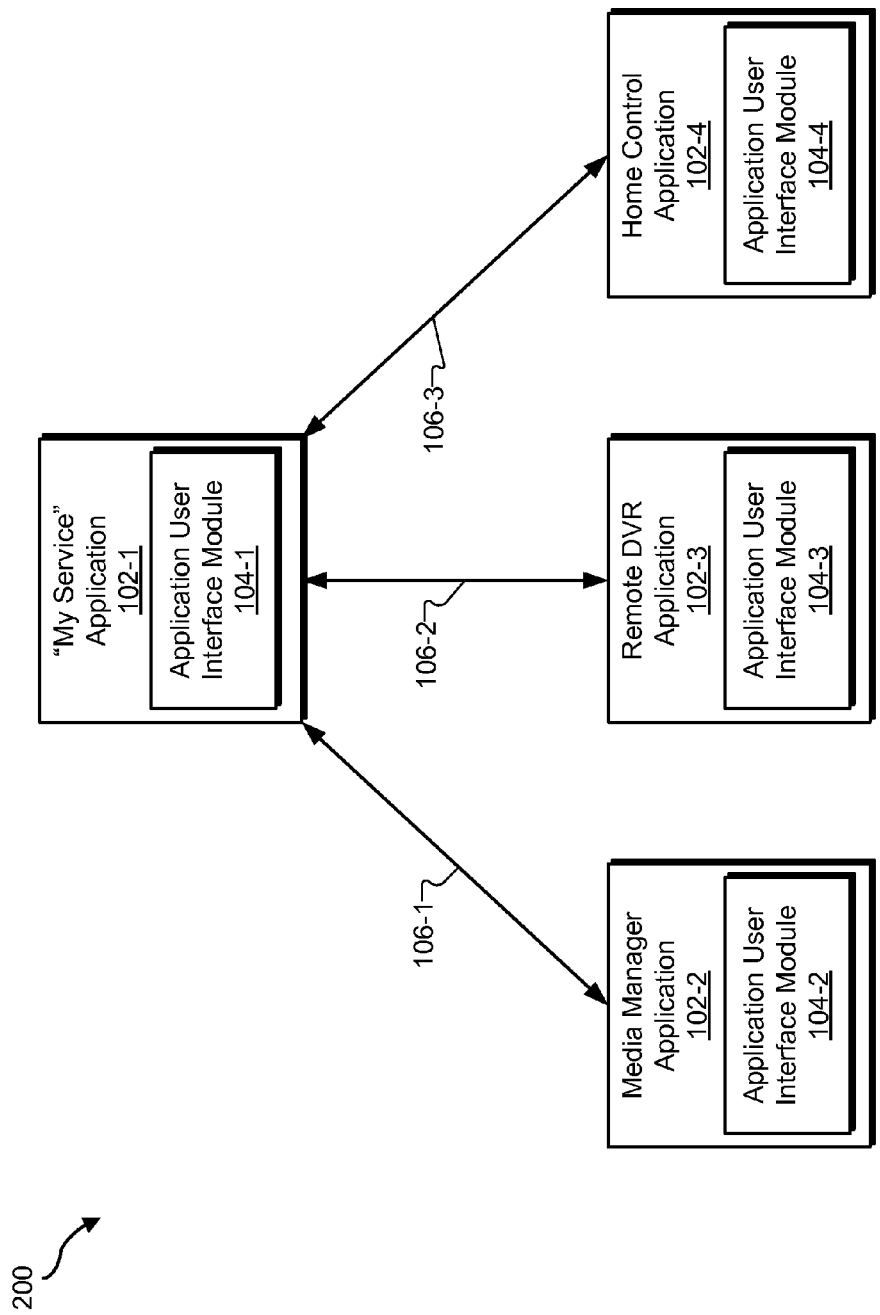
FIG. 2 illustrates an exemplary implementation of the suite of software applications shown in FIG. 1 according to principles described herein.

To illustrate, in one embodiment, software application 102-1 may comprise an "umbrella" service application providing links to other software applications 102-2 through 102-4 included in suite 100, software application 102-2 may comprise a media manager application that provides a user with functionality for managing media content (e.g., media managed by way of a cloud-based data storage service), software application 102-3 may comprise a mobile remote control application (e.g., a set-top box ("STB") and/or digital video recorder ("DVR") remote control application) that provides a user with functionality for remotely controlling one or more CE devices, and software application 102-4 may comprise a home control application that provides a user with functionality for remotely monitoring and controlling a home (e.g., for monitoring and controlling a security system, a camera, etc. located at a home). An example of such an embodiment is illustrated in FIG. 2 in which an implementation 200 of suite 100 of software applications 102 includes a "my service" application 102-1, a "media manager" application 102-2, a "remote DVR" application 102-3, and a "home control" application 102-4.

To provide users with opportunity to access software applications 102 included in suite 100, a developer or other entity may publish the software applications 102 to an application server subsystem configured to distribute the software applications 102 to one or more user computing devices for installation and execution on the user computing devices. To illustrate, FIG. 3 shows an exemplary computing system 300 that includes an application server subsystem 302 to which software applications 102 may be published.

Figure 3:
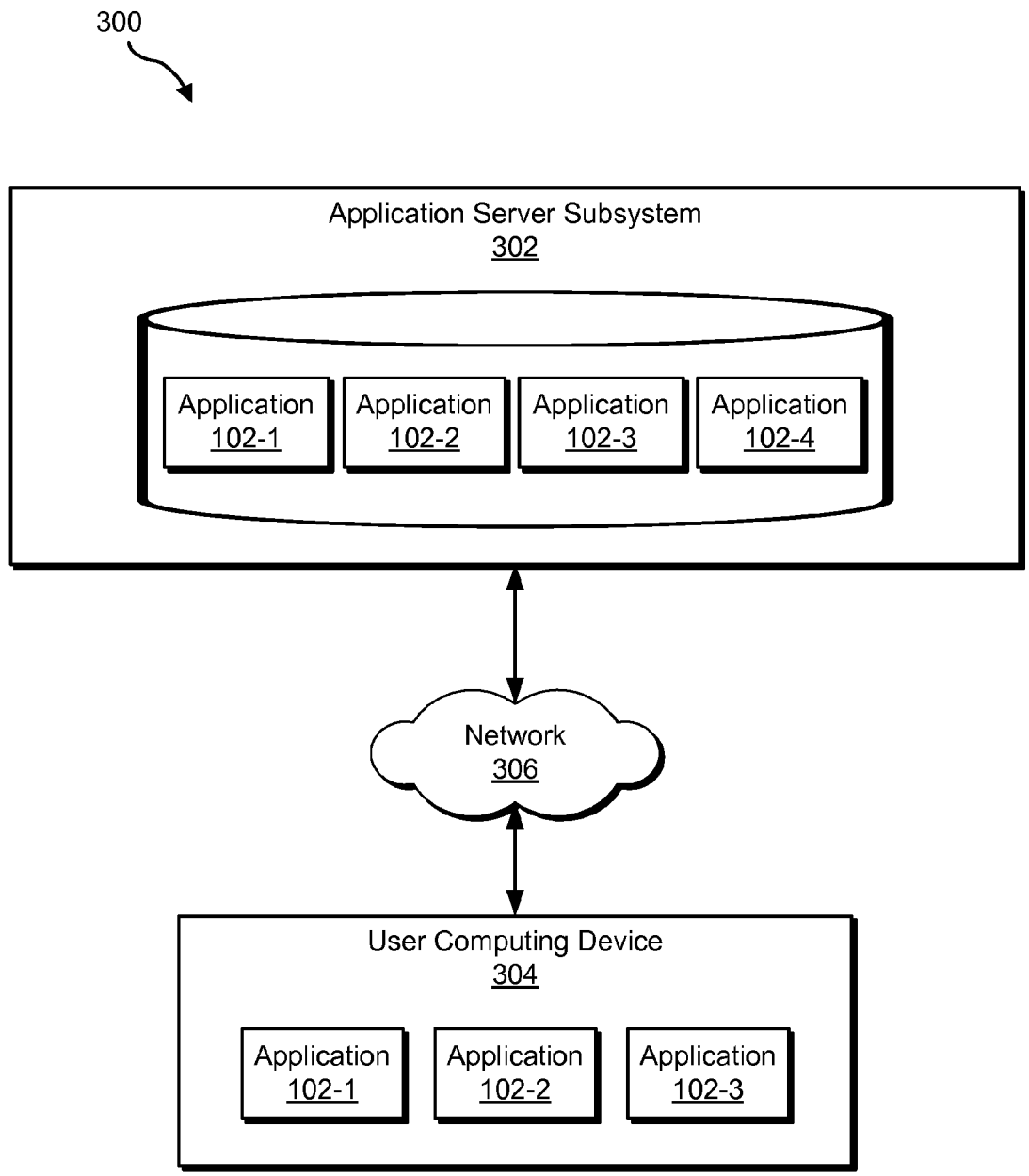
FIG. 3 illustrates an exemplary computing system according to principles described herein.

As shown in FIG. 3, computing system 300 may include application server subsystem 302 and a user computing device 304 configured to communicate with one another by way of a network 306. While FIG. 3 illustrates a single user computing device 304, this is for illustrative purposes only. Application server subsystem 304 may be configured to distribute software applications 102 to any number of user computing devices over network 306.

Application server subsystem 302 may include or be implemented by one or more server-side computing devices controlled by (e.g., operated by) one or more service providers such as one or more software application service providers. User computing device 304 may include or be implemented by one or more client-side computing devices controlled by (e.g., operated by) a user (e.g., an end user of one or more applications and/or services provided by application server subsystem 302). Examples of such devices may include, without limitation, a personal computer, a mobile phone, a smart phone, a tablet computer, a set-top box ("STB") device, a digital video recorder ("DVR") device, a gaming device, a portable media player device, a mobile and/or handheld computing device, and any other computing device configured to access a service provided by application server subsystem 302 and/or to execute one or more software applications distributed by application server subsystem 302, such as software applications 102 included in suite 100.

Application server subsystem 302 and user computing device 304 may communicate using any suitable remote communications technologies, including any remote communications technologies capable of supporting distribution of software applications by application server subsystem 302 to user computing device 304. Examples of such communication technologies include, without limitation, Global System for Mobile Communications ("GSM") technologies, Long Term Evolution ("LTE") technologies, Code Division Multiple Access ("CDMA") technologies, Time Division Multiple Access ("TDMA") technologies, Evolution Data Optimized Protocol ("EVDO") (e.g., "1×EVDO"), radio frequency ("RF") signaling technologies, radio transmission technologies (e.g., One Times Radio Transmission Technology ("1×RTT")), Transmission Control Protocol ("TCP"), Internet Protocol ("IP"), Session Initiation Protocol ("SIP"), Real-Time Transport Protocol ("RTP"), User Datagram Protocol ("UDP"), Hypertext Transfer Protocol ("HTTP"), Hypertext Transfer Protocol Secure ("HTTPS"), Ethernet, wireless communications technologies, other suitable communications technologies, and any combination or sub-combination thereof.

Application server subsystem 302 may distribute, and user computing device 304 may access, software applications 102 by way of network 306. Network 306 may include any network or combination of networks provided by one or more appropriately configured network devices (and communication links thereto) and over which communications and data (e.g., software application data) may be transported between application server subsystem 302 and user computing device 304. For example, network 306 may include, but is not limited to, a mobile phone network (e.g., a cellular phone network, a 3G network, a 4G network, etc.), a satellite media network (e.g., a broadcasting network, a terrestrial media broadcasting network, etc.), a media content distribution network (e.g., a subscriber television network, a media broadcasting, multicasting, and/or narrowcasting network, etc.), a telecommunications network, the Internet, a wide area network, any other network capable of transporting communications and data between application server subsystem 302 and user computing device 304, and/or any combination or sub-combination thereof.

In the example illustrated in FIG. 3, software applications 102 included in suite 100 have been published to application server subsystem 302 for distribution by application server subsystem 302 over network 306. Application server subsystem 302 stores data representative of the software applications 102 and is configured to transmit data representative of the software applications 102 over network 306 for access (e.g., download) by user computing device 304.

User computing device 304 may be configured to access any of the software applications 102 from application server subsystem 302 by way of network 306. For example, user computing device 304 may be configured to download any of the software applications 102 from application server subsystem 302 by way of network 306, install the downloaded software application(s) 102 on user computing device 304, and execute the installed software application(s) 102 on user computing device 304. In the specific example illustrated in FIG. 3, software applications 102-1, 102-2, 102-3, and 102-4 are available for download from application server subsystem 302, and user computing device 304 has downloaded and installed software applications 102-1, 102-2 and 102-3, but not software application 102-4.

A software application, such as a software application 102 included in suite 100, may include a structured hierarchy of menus. For example, the software application may include a tiered hierarchy of menus, and each menu in the hierarchy may include one or more user selectable menu options. The menu hierarchy may provide a user with structure for navigating menus and selecting menu options and corresponding functionality of the software application.

Figure 4:
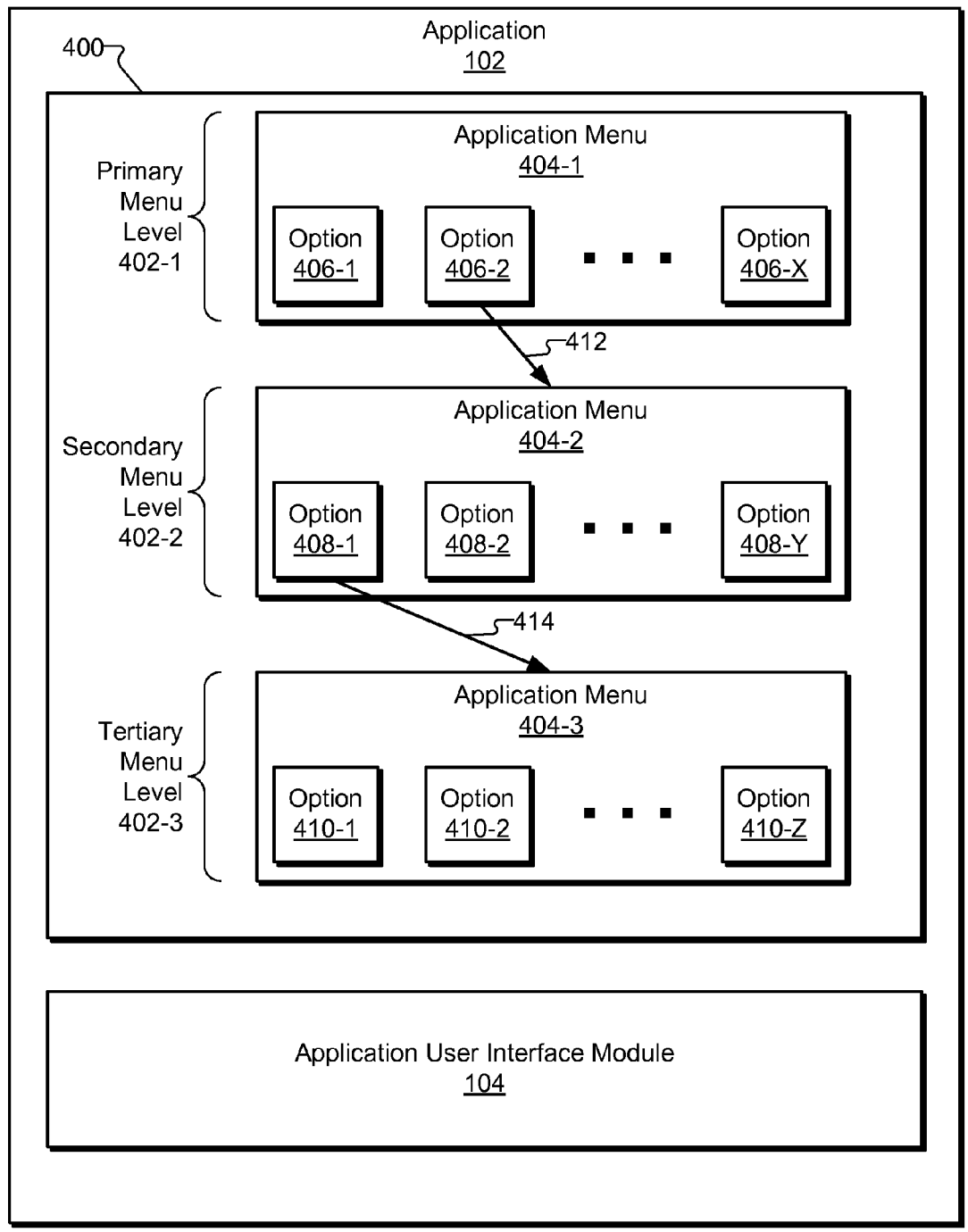
FIG. 4 illustrates an exemplary application menu hierarchy and application user interface module of a software application according to principles described herein.

To illustrate, FIG. 4 shows an exemplary software application 102 that includes an application menu hierarchy 400 having a plurality of tiered menu levels 402 (e.g., primary menu level 402-1, secondary menu level 402-2, and tertiary menu level 402-3). Menu levels 402 may be hierarchically related one to another. For example, primary menu level 402-1 may be a first menu level (e.g., a top menu level) within a software application 102, secondary menu level 402-2 may be a second menu level directly below primary menu level 402-1, and tertiary menu level 402-3 may be a third menu level directly below secondary menu level 402-2 within application menu hierarchy 400.

The number and/or relationships of menu levels 402 shown in FIG. 4 are illustrative only. Additional, fewer, and/or alternative menu levels and relationships between menu levels may be included in application menu hierarchy 400 in other examples.

Each menu level 402 may include one or more application menus, and each application menu may include one or more menu options. To illustrate, FIG. 4 further shows exemplary application menus 404 (e.g., application menus 404-1, 404-2, and 404-3) associated with respective menu levels 402 (e.g., menu levels 402-1, 402-2, and 402-3). As shown, primary menu level 402-1 may include application menu 404-1, secondary menu level 402-2 may include application menu 404-2, and tertiary menu level 402-3 may include application menu 404-3.

Each of the application menus 404 may include a set of one or more menu options. In the example shown in FIG. 4, application menu 404-1 includes a set of menu options 406 (e.g., menu options 406-1 through 406-X), application menu 404-2 includes a set of menu options 408 (e.g., menu options 408-1 through 408-Y), and application menu 404-3 includes a set of menu options 410 (e.g., menu options 410-1 through 410-Z).

A menu option, such as any of the menu options shown in FIG. 4, may be associated with a particular function of software application 102. Examples of such functions may include accessing digital content (e.g., media content) associated with a menu option, accessing an application menu associated with a menu option (e.g., an application menu that is a submenu of the selected menu option), linking to another software application, and/or any other functions of a software application.

Application menus 404 may be hierarchically related one to another in any suitable way. For example, application menu 404-2 may be a submenu of a menu option 406 included in application menu 404-1. In FIG. 4, arrow 412 indicates that application menu 404-2 is a submenu of menu option 406-2. Accordingly, in response to a user selection of menu option 406-2 of application menu 404-1, application menu 404-2 may be accessed by software application 102. In addition, arrow 414 in FIG. 4 indicates that application menu 404-3 is a submenu of menu option 408-1 of application menu 404-2. Accordingly, in response to a user selection of menu option 408-1 of application menu 404-2, application menu 404-3 may be accessed by software application 102. By selecting menu option 406-2 in application menu 404-1 and then menu option 408-1 in application menu 404-2, a user of a computing device executing software application 102 may drill down through hierarchical menu levels 404 to access application menu 404-3.

The relationship between application menus 404 and menu options of the application menus 404 described above is illustrative only. Additional and/or alternative relationships between application menus 404 and menu options of the application menus 404 may be used in other examples. For example, additional application menus within secondary menu level 402-2 may be submenus of one or more other menu options 406 included in application menu 404-1, and additional application menus within tertiary menu level 402-3 may be submenus of one or more menu other options 408 included in application menu 404-2.

As further illustrated in FIG. 4, software application 102 may further include an application user interface module 104, which may be configured to direct a computing device executing software application 102 to provide a user interface through which a user of the computing device may interact with software application 102, such as by navigating application menus 404 and associated menu options of software application 102. For example, application user interface module 104 included in software application 102 may be configured to generate a GUI and direct a computing device executing software application 102 to provide one or more views of the GUI for display on a display screen.

Figure 5:
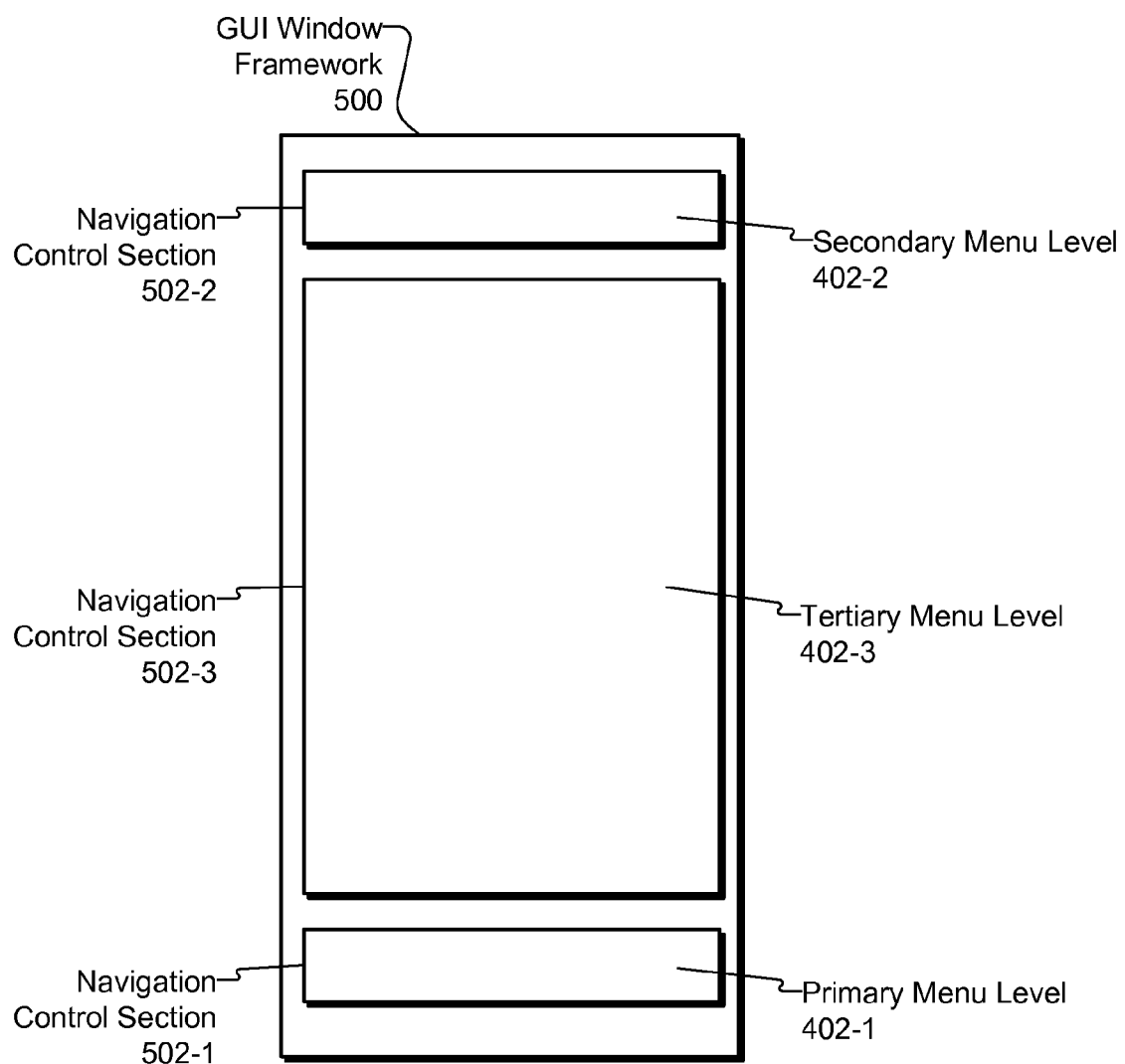
FIG. 5 illustrates an exemplary application graphical user interface framework according to principles described herein.

Application user interface module 104 may be configured to generate and provide GUI views for display in accordance with a GUI window framework. FIG. 5 shows a wireframe representation of an application GUI window framework 500 ("GUI framework 500") that may be used by application user interface module 104 to generate application GUI views for display by a computing device and use by a user of the computing device to interact with software application 102. GUI framework 500 may include a plurality of navigation control sections 502 (e.g., navigation control sections 502-1, 502-2, and 502-3) respectively associated with (e.g., mapped to) multiple hierarchical menu levels 402 (e.g., menu levels 402-1, 402-2, and 402-3) of software application 102. As shown in FIG. 5, in certain examples, navigation control section 502-1 may be mapped to primary menu level 402-1, navigation control section 502-2 may be mapped to primary menu level 402-2, and navigation control section 502-3 may be mapped to primary menu level 402-3.

The mapping of navigation control sections 502 to respective hierarchical menu levels 402 may be used by application user interface module 104 to determine content to be displayed in the navigation control sections 502. To illustrate, based on the mapping of navigation control section 502-1 to primary menu level 402-1, application user interface module 104 may select application menu 404-1 of primary menu level 402-1 for display within navigation control section 502-1. Accordingly, one or more of the menu options 406 included in application menu 404-1 may be represented (e.g., as a set of icons or other graphics) within navigation control section 502-1 in a display of GUI framework 500.

One of the menu options 406 represented in navigation control section 502-1 may be selected by way of a default selection by application user interface module 104 (e.g., a default selection of a first-listed menu option when application menu 404-1 is launched within navigation control section 502-1), by way of a user selection provided through a GUI view of GUI framework 500, or by way of any other suitable menu option selection event. For example, menu option 406-2 may be selected within navigation control section 502-1 in any of the ways described above.

In response to a selection of menu option 406-2 in navigation control section 502-1 and based on a mapping of navigation control section 502-2 to secondary menu level 402-2, a submenu of menu option 406-2 that is included in secondary menu level 402-2 may be selected by application user interface module 104 for display within navigation control section 502-2. For example, application menu 404-2 may be a submenu of selected menu option 406-2, and application user interface module 104 may select application menu 404-2 for display within navigation control section 502-2. Accordingly, one or more of the menu options 408 included in application menu 404-2 may be represented (e.g., as a set of icons or other graphics) within navigation control section 502-2 in a display of a GUI view of GUI framework 500.

In certain examples, one of the menu options 408 represented in navigation control section 502-2 may be selected in any of the ways described above. For example, menu option 408-1 may be selected within navigation control section 502-2 in any of the ways described above.

In response to a selection of menu option 408-1 in navigation control section 502-2 and based on a mapping of navigation control section 502-3 to tertiary menu level 402-3, a submenu of menu option 408-1 that is included in tertiary menu level 402-3 may be selected by application user interface module 104 for display within navigation control section 502-3. For example, application menu 404-3 may be a submenu of selected menu option 408-1, and application user interface module 104 may select application menu 404-3 for display within navigation control section 502-3. Accordingly, one or more of the menu options 410 included in application menu 404-3 may be represented (e.g., as a set of icons or other graphics) within navigation control section 502-3 in a display of a GUI view of GUI framework 500.

Figure 6:
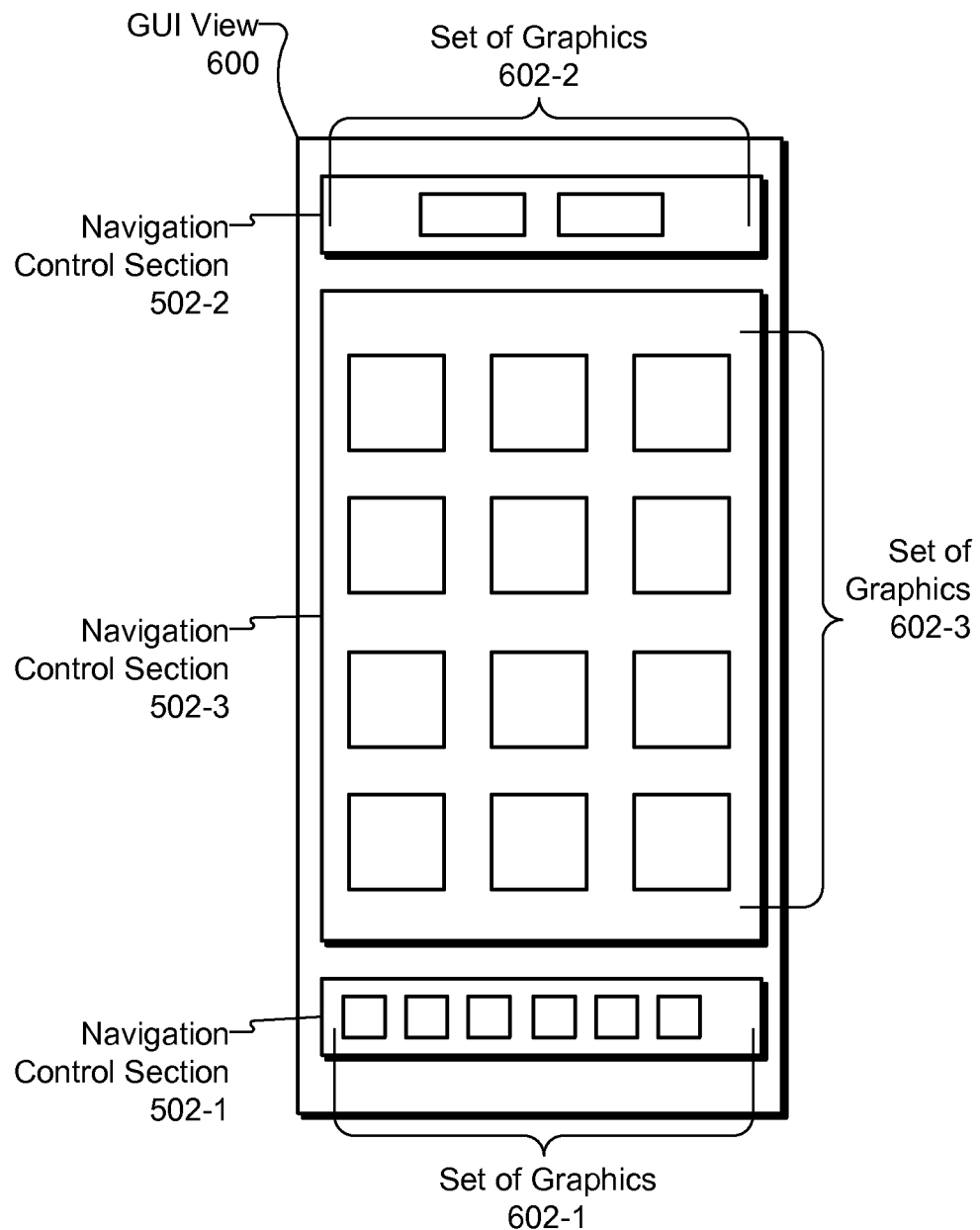
FIG. 6 illustrates exemplary graphics displayed within the exemplary application graphical user interface framework of FIG. 5 according to principles described herein.

FIG. 6 illustrates an exemplary wireframe GUI view 600 of GUI framework 500. As shown, GUI view 600 may include sets of graphics displayed within navigation control sections 502. The sets of graphics may represent sets of menu options of respective application menus. In the illustrated example, navigation control section 502-1 may include a first set 602-1 of graphics that represent menu options of a first application menu (e.g., application menu 404-1), navigation control section 502-2 may include a second set 602-2 of graphics that represent menu options of a second application menu (e.g., application menu 404-2), and navigation control section 502-3 may include a third set 602-3 of graphics that represent menu options of a third application menu (e.g., application menu 404-3).

Navigation control sections 502 may be concurrently included GUI framework 500. Accordingly, a GUI view, such as GUI view 600, generated in accordance with GUI framework 600 may include navigation control sections 502 displayed concurrently within the GUI view 600. Accordingly, multiple hierarchical menu levels 402 associated with the navigation control sections 502 may be concurrently represented in the displayed GUI view 600. The concurrent representation of multiple hierarchical menu levels 402 in a single displayed GUI view 600 may be said to "flatten out" the hierarchical menu levels 402 within GUI view 600 at least because a user interacting with GUI view 600 is not required to navigate away from one of the menu levels 402 and/or GUI view 600 in order to navigate to another of the menu levels 402. For example, the user is able to drill up and down the hierarchical menu levels 402 within a single GUI view 600 and without having to leave the GUI view 600. This may facilitate a user having a convenient, intuitive, and/or usable experience navigating hierarchical menu levels 402 of software application 102.

One or more of navigation control sections 502 may be in the form of linear navigational control bars. In certain examples, for instance, navigation control section 502-1 may be in the form of a linear footer bar displayed at or near the bottom of GUI framework 500, navigation control section 502-2 may be in the form of a linear header bar displayed at or near the top of GUI framework 500, and navigation control section 502-3 may be displayed between navigation control section 502-1 and navigation control section 502-2 in GUI framework 500, such as is shown in FIG. 5. Accordingly, menu options 406 of application menu 404-1 associated with primary menu level 402-1 may be represented within a footer bar, menu options 408 of application menu 404-2 associated with secondary menu level 402-2 may be represented within a header bar, and menu options 410 of application menu 404-3 associated with tertiary menu level 402-3 may be represented within an area positioned between the footer bar and the header bar.

Exemplary GUI window views that may be generated in accordance with GUI framework 500 and provided by application user interface module 104 of software application 102 for display on a display screen associated with a user computing device will now be described in reference to FIGS. 7-11.

Figure 7:
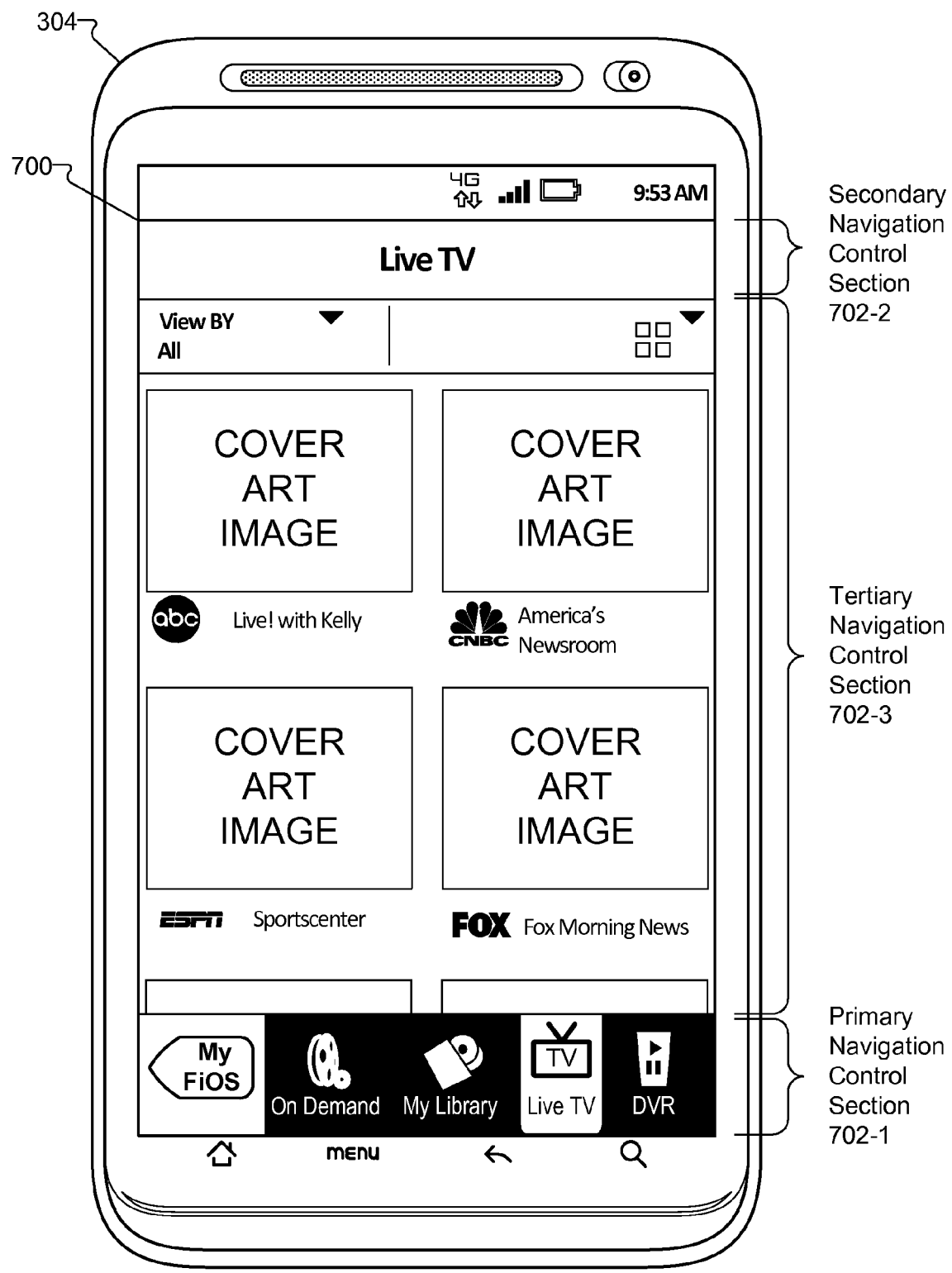
FIGS. 7-11 illustrate exemplary graphical user interface views according to principles described herein.

FIG. 7 illustrates user computing device 304 displaying an application GUI view 700 on a display screen of user computing device 304 as directed by application user interface module 104 of software application 102. For purposes of the illustrated example, software application 102 is a mobile remote software application being executed by computing device 304 and configured to provide, by way of GUI view 700, a user of computing device 304 with mobile access to and/or control of features associated with a subscriber television service (e.g., a subscriber home television service known as "FiOS") to which the user subscribes.

The mobile remote software application includes a plurality of application menus structured into at least a primary menu level, a secondary menu level, and a tertiary menu level, such as described above. The primary menu level of the mobile remote software application may include a primary-level application menu ("primary application menu") having a set of menu options that may include selectable menu options such as a "watch list" option, an "on demand" option, a "my library" option, a "live TV" option, a "DVR" option, a "TV listings" option, and a "settings" option, each of which may be configured to be selected to initiate access to an application submenu that is associated with the selected option and that is part of the secondary menu level of the mobile remote software application.

At least a subset of the set of options of the primary application menu may be graphically represented within a primary navigation control section 702-1 in GUI view 700. In the illustrated example, primary navigation control section 702-1 is in the form of a footer bar positioned at the bottom of the display screen of computing device 304. As shown, the "on-demand," "my library," "live TV," and "DVR" options of the primary application menu may be represented by a set of graphics within the footer bar. As further shown, the "live TV" option is highlighted to indicate that the "live TV" option is the currently selected option of the primary application menu.

In response to a selection of the "live TV" option in the footer bar, application user interface module 104 may identify, from the application menu structure of the mobile remote software application, a secondary-level application menu ("secondary application menu") of the mobile remote software application that is associated with the "live TV" option (e.g., is a submenu of the "live TV" option).

The identified secondary application menu may include a set of one or more menu options. If the secondary application menu includes only a single menu option, application user interface module 104 may represent the single menu option as a title in a secondary navigation control section 702-2 in GUI view 700. To illustrate, the secondary application menu may include only a single "live TV" option, which may be represented as a "live TV" title in secondary navigation control section 702-2 in GUI view 700. In FIG. 7, for example, secondary navigation control section 702-2 is in the form of a header bar positioned at the top of the display screen of computing device 304 and that includes the title "live TV" to represent the single menu option of secondary navigation control section 702-2. An example of secondary application menu including a set of multiple menu options represented in secondary navigation control section 702-2 is described further below.

In response to the identification of the secondary application menu that includes only the single "live TV" menu option for use to populate the header bar in GUI 700, application user interface module 104 may identify, from the application menu structure of the mobile remote software application, a tertiary-level application menu ("tertiary application menu") of the mobile remote software application that is associated with the "live TV" option of the secondary application menu (e.g., is a submenu of the "live TV" option of the secondary application menu).

The identified tertiary application menu may include a set of one or more menu options. For example, the menu options included in the tertiary application menu may include live television programs that are accessible by the user of computing device 304 based on a user subscription to a subscriber television service.

At least a subset of the set of menu options of the tertiary application menu may be graphically represented within a tertiary navigation control section 702-3 in GUI view 700. In the illustrated example, tertiary navigation control section 702-3 is positioned between the footer bar and the header bar described above and includes a set of graphics representing menu options included in the tertiary application menu. As shown, the menu options represented in tertiary navigation control section 702-3 may include live television programs. In GUI view 700 of FIG. 7, for example, a live television program titled "Live! with Kelly" is represented by a cover art image and title of the live television program, as well as by a channel logo for a content provider providing the live television program. The user of computing device 304 may select a graphic representing a live television program in tertiary navigation control section 702-3 in order to request access to the live television program. In response to the selection, computing device 304 may access and present the live television program for experiencing by the user.

Referring again to the primary navigation control section 702-1 illustrated in FIG. 7, the user of computing device 304 may provide input, by way of the primary navigation control section 702-1 displayed in GUI view 700, to select a different menu option included in the primary application menu. The user input may be provided by the user and received by computing device 304 in any suitable way. For example, the display screen of computing device 304 may comprise a touch screen display, and the user may touch a displayed graphic that represents another menu option in order to select that menu option.

To illustrate, within primary navigation control section 702-1 shown in FIG. 7, the user may select the "DVR" option of the primary application menu. In response, application user interface module 104 may highlight the graphic representing the "DVR" option to indicate the selection of the "DVR" option and update the content included in secondary navigation control section 702-2 and tertiary navigation control section 702-3 based on the selection.

Figure 8:
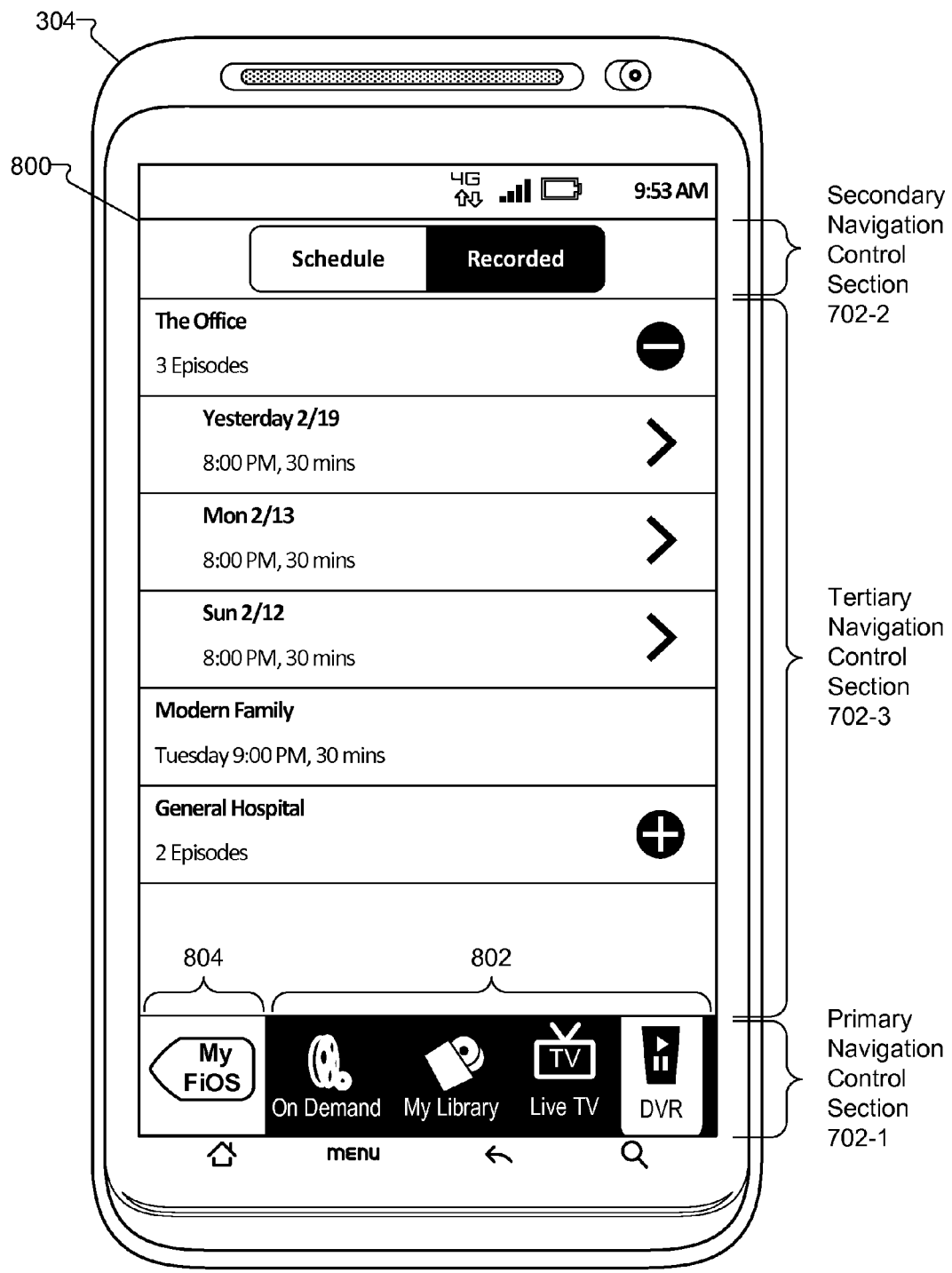

FIG. 8 illustrates an exemplary GUI view 800 that may be displayed on the display screen of computing device 304 when the "DVR" option of the primary application menu represented in primary navigation control section 702-1 is selected. As shown, a graphic representing the "DVR" option is highlighted, and secondary navigation control section 702-2 now includes graphics representing menu options of an application menu that is associated with secondary menu level 402-2 of software application 102 and that is a submenu of the selected "DVR" option. In the illustrated example, the menu options represented in secondary navigation control section 702-2 include a "schedule" menu option and a "recorded" menu option. Thus, FIG. 8 illustrates an example in which secondary navigation control section 702-2 in the form of a linear header bar includes graphics representing multiple menu options of a secondary application menu associated with secondary menu level 402-2. When the "recorded" menu option is selected, tertiary navigation control section 702-3 includes graphics representing menu options that correspond to recorded media programs (e.g., recordings of episodes of television programs titled "The Office," "Modern Family," and "General Hospital"), as shown in FIG. 8. When the "schedule" menu option is selected in secondary navigation control section 702-2, tertiary navigation control section 702-3 may be updated to instead include graphics representing menu options that correspond to scheduled recordings of media programs.

As shown in FIGS. 7-8, primary navigation control section 702-1 and secondary navigation control section 702-2 may be in the form of linear, horizontally oriented, navigation control bars. Each bar may include a linearly arranged row of graphics representing menu options of an application menu. In the illustrated examples, primary navigation control section 702-1 is in the form of a linear footer bar, and secondary navigation control section 702-2 is in the form of a linear header bar.

In certain examples, primary navigation control section 702-1 may include a slidable segment 802 and a fixed segment 804. Fixed segment 804 will be described further below. As shown in FIG. 8, slidable segment 802 may include graphics representing menu options of a primary application menu. The menu options represented in slidable segment 802 may be only a subset of the menu options of the primary application menu. To bring other menu options not currently represented in slidable segment 802, a user of user computing device 304 may provide input to cause slidable segment 802 to slide to the left or right to bring graphics representing other menu options on screen in slidable segment 802. More specifically, the user input may cause the graphics representing menu options to scroll to the left or right such that a different subset of menu options is represented in slidable segment 802. The user input may be in any suitable form. For example, the user may perform an on-screen touch gesture (e.g., a swipe to the left or right) to cause a sliding/scrolling action to be performed by application user interface module 104.

To illustrate one example, while GUI view 800 is displayed as shown in FIG. 8, the user of user computing device 304 may provide input configured to cause graphics within slidable segment 802 to slide from right to left across the display screen. In response, application user interface module 104 may update the contents of slidable segment 802 to represent a sliding of one or more of the graphics shown in FIG. 8 off screen to the left and a sliding of one or more other graphics on screen from the right.

Figure 9:
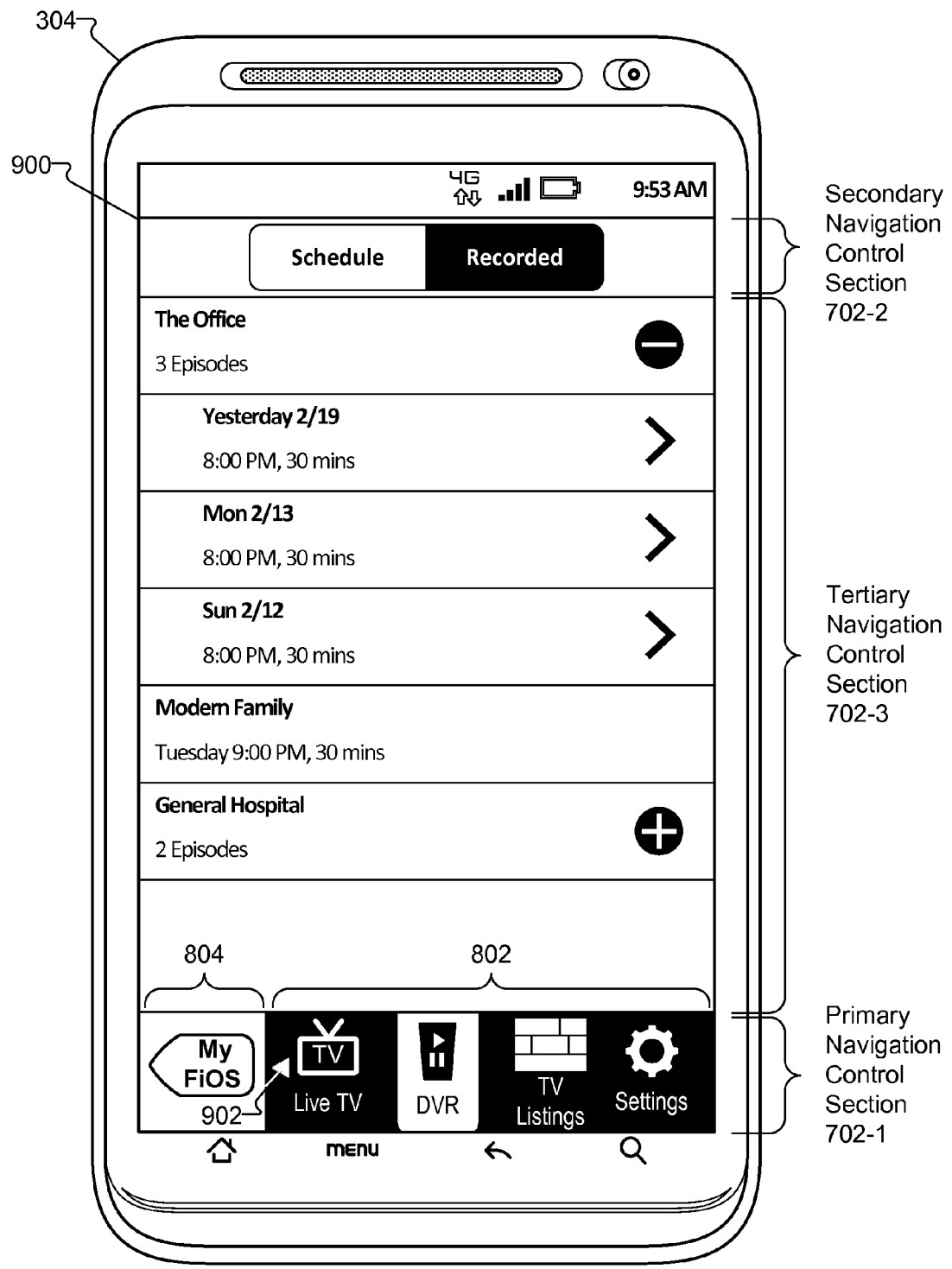

FIG. 9 illustrates a GUI view 900 that may be displayed on the display screen of user computing device 304 in response to user computing device 304 receiving the user input described above. As shown, a new set of graphics representing a different subset of menu options of the primary application menu are now displayed within slidable segment 802. Compared to GUI view 800, the "on demand" option and "my library" option are no longer represented in slidable segment 802, and a "TV listings" option and "settings" option are now represented in slidable segment 802.

Slidable segment 802 may provide flexibility and/or scalability to developers of GUIs and users of user computing device 304. For example, the number of menu options that may be associated with a primary application menu is not limited to only the number of menu options that can be concurrently represented on screen within a footer bar and, thus, not dependent on display screen attributes (e.g., screen size and/or resolution). Rather, any number of menu options may be included in a primary application menu, and slidable segment 802 may provide a flexible, intuitive, and convenient tool for use by a user of user computing device 304 to navigate and select from the menu options included in the primary application menu. In at least this respect, the sliding capability of slidable segment 802 of primary navigation control section 702-1 may support the flattening of a menu hierarchy of a software application (e.g., menu hierarchy 400 of software application 102) within a single GUI view, such as described above.

In certain examples, application user interface module 104 may be configured to display one or more graphics in slidable segment 802 to indicate an availability and/or direction of one or more off-screen menu options included in the primary application menu. In FIG. 9, for example, an arrow indicator 902 is displayed to indicate that one or more menu options are available off screen to the left. The lack of such an indicator within the right edge of slidable segment 802 may indicate that the "settings" option is the right-most positioned menu option and that no additional menu options are available off screen to the right.

Figure 10:
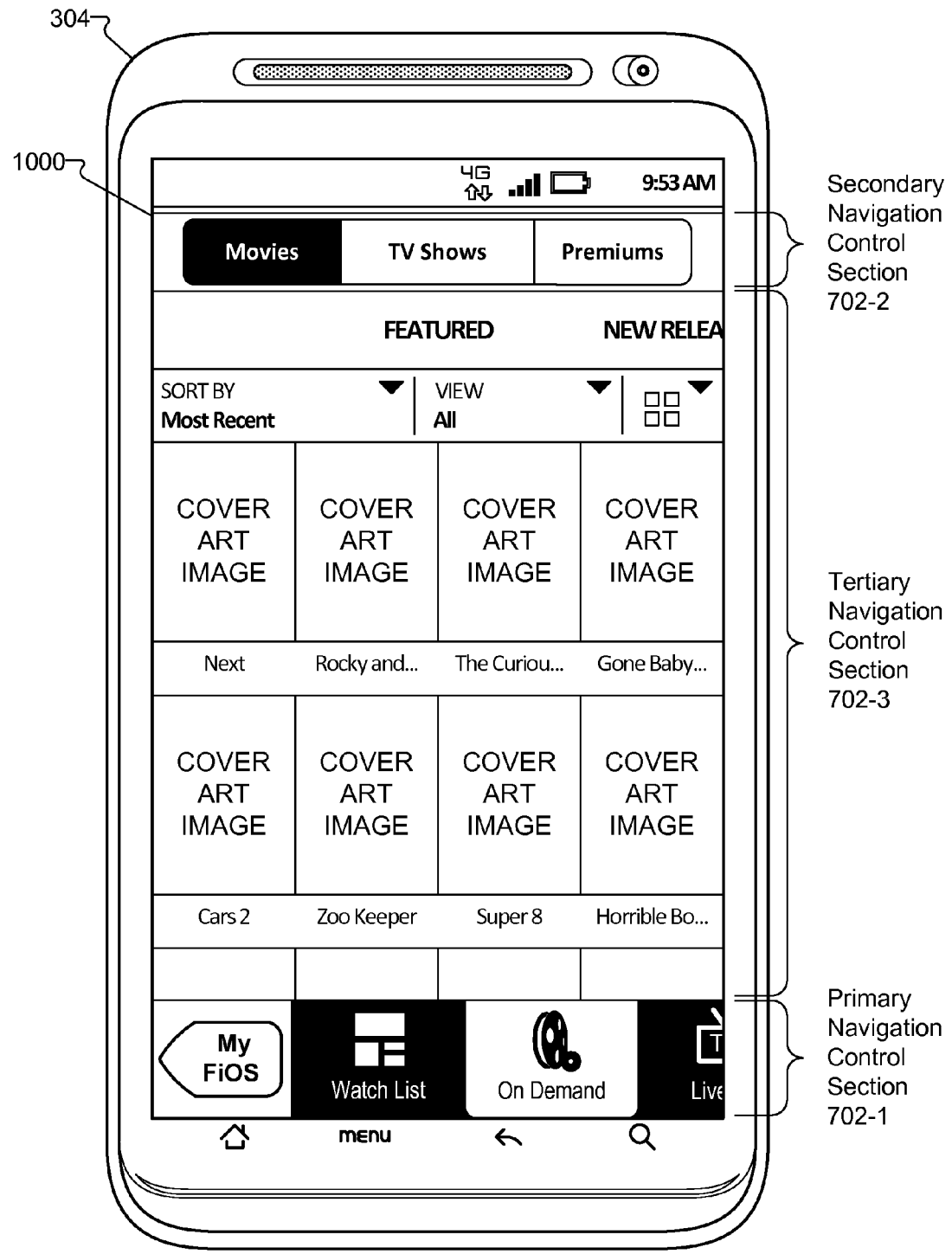

FIG. 10 illustrates another exemplary GUI view 1000 that may be displayed on a display screen of user computing device 304. As shown, an "on demand" menu option may be selected in primary navigation control section 702-1, and graphics representing menu options (e.g., a "movies" option, a "TV shows" option, and a "premiums" option") associated with a submenu of the selected "on demand" option may be displayed in secondary navigation control section 702-2. As further shown, a "movies" menu option may be selected in secondary navigation control section 702-2, and graphics representing menu options (e.g., graphics representing selectable movies) associated with a submenu of the selected "movies" option may be displayed in tertiary navigation control section 702-3.

Figure 11:
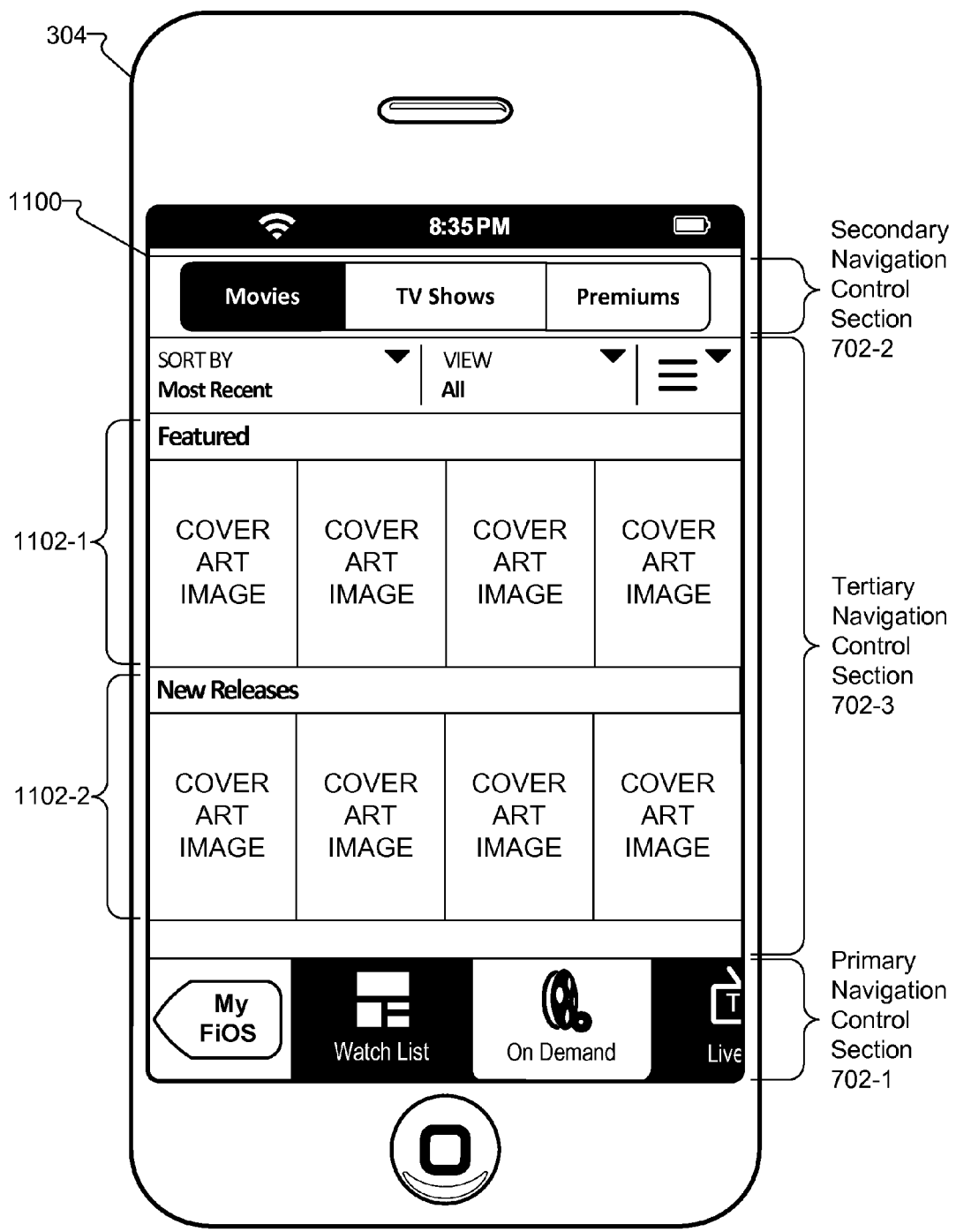

FIG. 11 illustrates another exemplary GUI view 1100 that may be displayed on a display screen of user computing device 304. As shown, an "on demand" menu option may be selected in primary navigation control section 702-1, and graphics representing menu options (e.g., a "movies" option, a "TV shows" option, and a "premiums" option") associated with a submenu of the selected "on demand" option may be displayed in secondary navigation control section 702-2. As further shown, a "movies" menu option may be selected in secondary navigation control section 702-2, and graphics representing menu options (e.g., graphics representing selectable movies) associated with a submenu of the selected "movies" option may be displayed in tertiary navigation control section 702-3.

In tertiary navigation control section 702-3, graphics representing selectable movies may be arranged in any suitable way, such as in rows by category of the movies as illustrated in GUI view 1100. As shown, GUI view 1100 may include a first row 1102-1 of graphics that represent "featured" movies and a second row 1102-2 of graphics that represent movies that are "new releases." Additional and/or alternative row categories may be displayed in other examples. In some examples, each row 1102 may be independently slidable to the right and/or left (e.g., to scroll the graphics representing the movies to the right or left). In some examples, a user selection of a category row or a graphic representing a movie in tertiary navigation control section 702-3 may cause application user interface module 104 to update the contents of tertiary navigation control section 702-3 to include a full section view of graphics representing movies included in the category associated with the selected movie. For example, a user may select the "featured" movie row or a movie included in the "featured" movie row, and in response application user interface module 104 may update tertiary navigation control section 702-3 to include a full section view of graphics representing "featured" movies.

Referring again to FIG. 8, fixed segment 804 of primary navigation control section 702-1 may provide a persistent link from the software application 102 that is executing on and directing user computing device 304 to display GUI view 800 to another software application 102 included in suite 100. For example, fixed segment 804 may include a graphic representing a persistent link from a "destination" application to an "umbrella" application in suite 100. In the illustrated example, fixed segment 804 includes a graphic visually indicating a persistent link to an "umbrella" application titled "My FiOS."

To further illustrate, software application 102-3 may be a mobile remote software application executing on user computing device 304 and directing user computing device 304 to display GUI view 800 on the display screen of user computing device 304. From GUI view 800, the user of user computing device 304 may select the persistent link represented in fixed segment 804. In response, software application 102-3 may link to software application 102-1, which may be an "umbrella" application in suite 100, by directing user computing device 304 to launch software application 102-1. In this manner, the user may conveniently access software application 102-1 from software application 102-3 (or from other "destination" software applications 102-1 and 102-3 included in suite 100).

The link represented in fixed segment 804 may be persistent for one or more reasons. As an example, fixed segment 804 may be a fixed feature of any GUI view and/or all GUI views displayed as directed by a "destination" software application included in suite 100. Additionally or alternatively, fixed segment 804 may have a fixed position across the GUI views of the "destination" applications included in suite 100. Accordingly, from any navigational menu or location within a menu hierarchy of a "destination" application and/or from any GUI view provided by a "destination" software application included in suite 100, a user of user computing device 304 may conveniently access the "umbrella" software application by selecting (e.g., with a single input) the persistent link represented in fixed segment 804.

The "umbrella" application in suite 100 may include links to the "destination" applications in suite 100. Such links may be presented in any suitable manner for user selection in GUI views displayed by user computing device 304 as directed by the "umbrella" application. For example, software application 102-1 may direct user computing device 304 to display a GUI view having user interface elements arranged in accordance with GUI framework 500. One or more of the menu options represented in any of the navigation control sections 502 of the GUI view may be configured to function as a link to one of the "destination" software applications 102-2, 102-3, or 102-3. Accordingly, software application 102-1 may function as a link farm through which the user may access the "destination" software applications 102-2, 102-3, or 102-3.

In certain implementations, the "umbrella" application may implement widgets associated with one or more of the "destination" applications included in suite 100. For example, a GUI view provided as directed by the "umbrella" application may include one or more rows within a tertiary navigation control section 502-3. Each row may be associated with a respective "destination" application and may include one or more widgets that implement and/or provide access to one or more functions and/or menus of the "destination" application.

In certain examples, software applications 102 included in suite 100 may be configured to preserve state. Accordingly, in some examples, linking from one software application to another software application in suite 100 may link to the last preserved state of the other software application. If a preserved state is not available for a software application being linked to, a default landing page or default state of the software application may be linked to.

While certain examples of GUI views described herein are directed to GUI views for a particular software application, this is illustrative only. Any of software applications 102 included in suite 100 may be configured to provide GUI views in accordance with a common GUI framework, such as GUI framework 500. In certain examples, all of the software applications 102, or at least all of the "destination" software applications, included in suite 100 may be configured to provide GUI views in accordance with GUI framework 500. This may provide consistency and/or uniformity across the suite 100 of software applications 102, which may facilitate quality user experiences. Any of the exemplary GUI views illustrated herein may be a landing page of a software application or may be a deeper page of the software application.

While certain examples of GUI window frameworks and GUI views described herein are directed to a GUI window framework in which a first navigation control section is in the form of a footer bar, a second navigation control section is in the form of a header bar, and a third navigation control section is positioned between the footer bar and the header bar, these examples are illustrative only. The navigation control sections may be arranged in accordance with another GUI window framework in other examples. For example, first and/or second navigation control sections may be in the form of vertical columns along left and/or right edges of a GUI window. In certain examples, for instance, any elements of an exemplary footer bar described herein may be elements of a left-edge or right-edge column.

Figure 12:
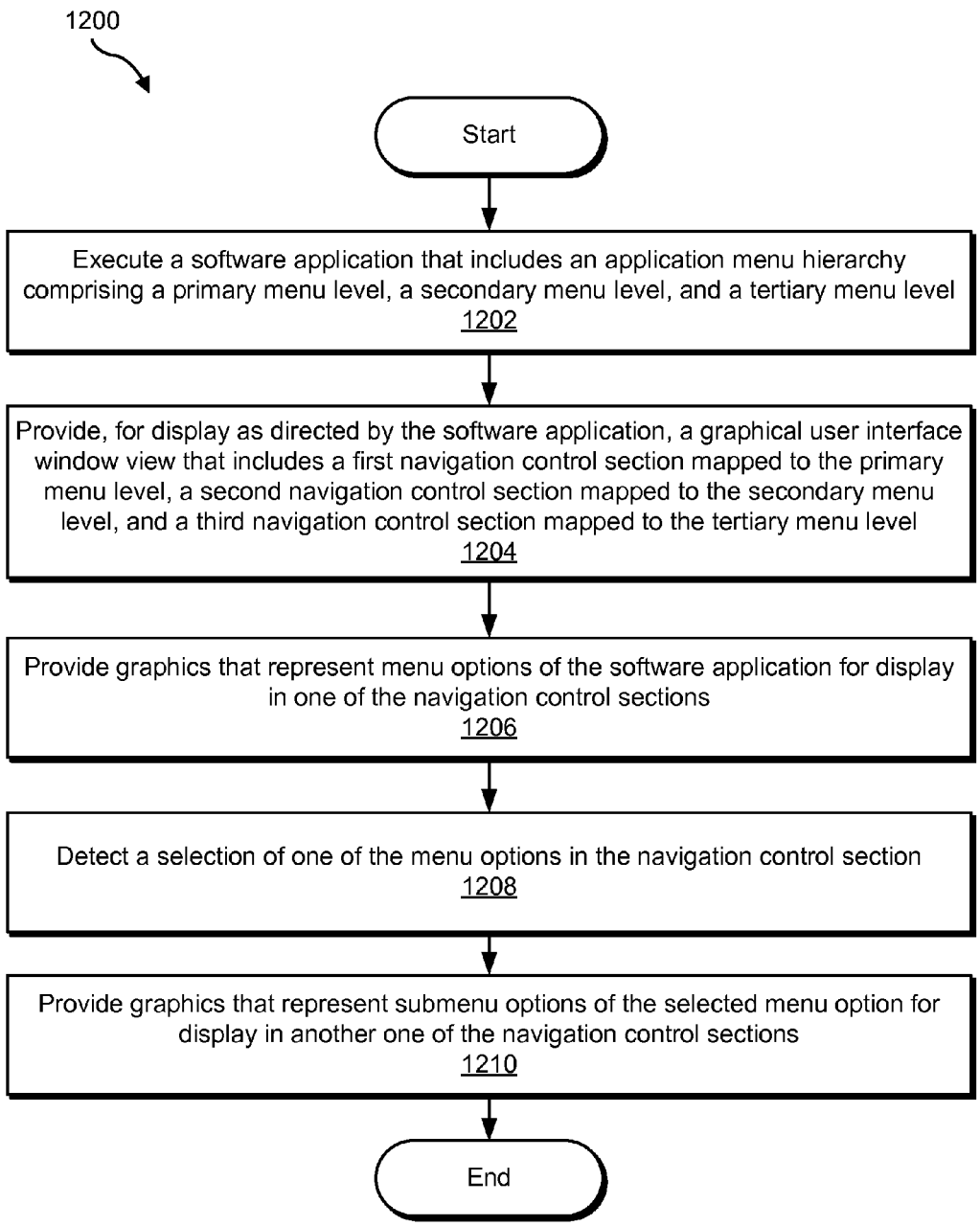
FIGS. 12-13 illustrate exemplary application user interface methods according to principles described herein.

FIG. 12 illustrates an exemplary application user interface method 1200. While FIG. 12 illustrates exemplary steps according to one embodiment, other embodiments may omit, add to, reorder, combine, and/or modify any of the steps shown in FIG. 12. One or more of the steps shown in FIG. 12 may be performed by an application user interface module 104, a software application implementing an application user interface module 104, and/or a user computing device as directed by an application user interface module 104 and/or a software application implementing an application user interface module 104. In certain examples, one or more of the step shown in FIG. 12 may be repeated.

In step 1202, a user computing device executes a software application (e.g., a software application installed on the user computing device) that includes an application menu hierarchy comprising a primary menu level, a secondary menu level, and a tertiary menu level, such as described herein.

In step 1204, the user computing device provides, for display as directed by the software application, a GUI window view that includes a first navigation control section mapped to the primary menu level, a second navigation control section mapped to the secondary menu level, and a third navigation control section mapped to the tertiary menu level. Step 1204 may be performed in any of the ways described herein, and the GUI window view may include an exemplary GUI view illustrated herein.

In step 1206, the user computing device provides graphics that represent menu options of the software application for display in one of the navigation control sections. For example, the user computing device may provide, for display in the first navigation control section, a set of graphics that represent a set of menu options of an application menu associated with the primary menu level of the software application.

In step 1208, the user computing device detects a selection of one of the menu options in the navigation control section. For example, the user computing device may detect, in the first navigation control section, a selection of a menu option included in the set of menu options represented by the set of graphics in the first navigation control section.

In step 1210, the user computing device provides graphics that represent submenu options of the selected menu option for display in another one of the navigation control sections. For example, the user computing device may provide, for display in the second navigation control section, a second set of graphics that represent a second set of menu options of a second application menu associated with the secondary menu level of the software application. The second set of menu options may be submenu options of the menu option selected in the first navigation control section in step 1208. In some examples, step 1210 may be performed in response to the detection of the selection in step 1208.

In some examples, steps 1208 and 1210 may be repeated, for example, to detect a selection of a menu option included in the second navigation control section and to provide graphics that represent submenu options of the selected menu option for display in a third navigation control section.

Figure 13:
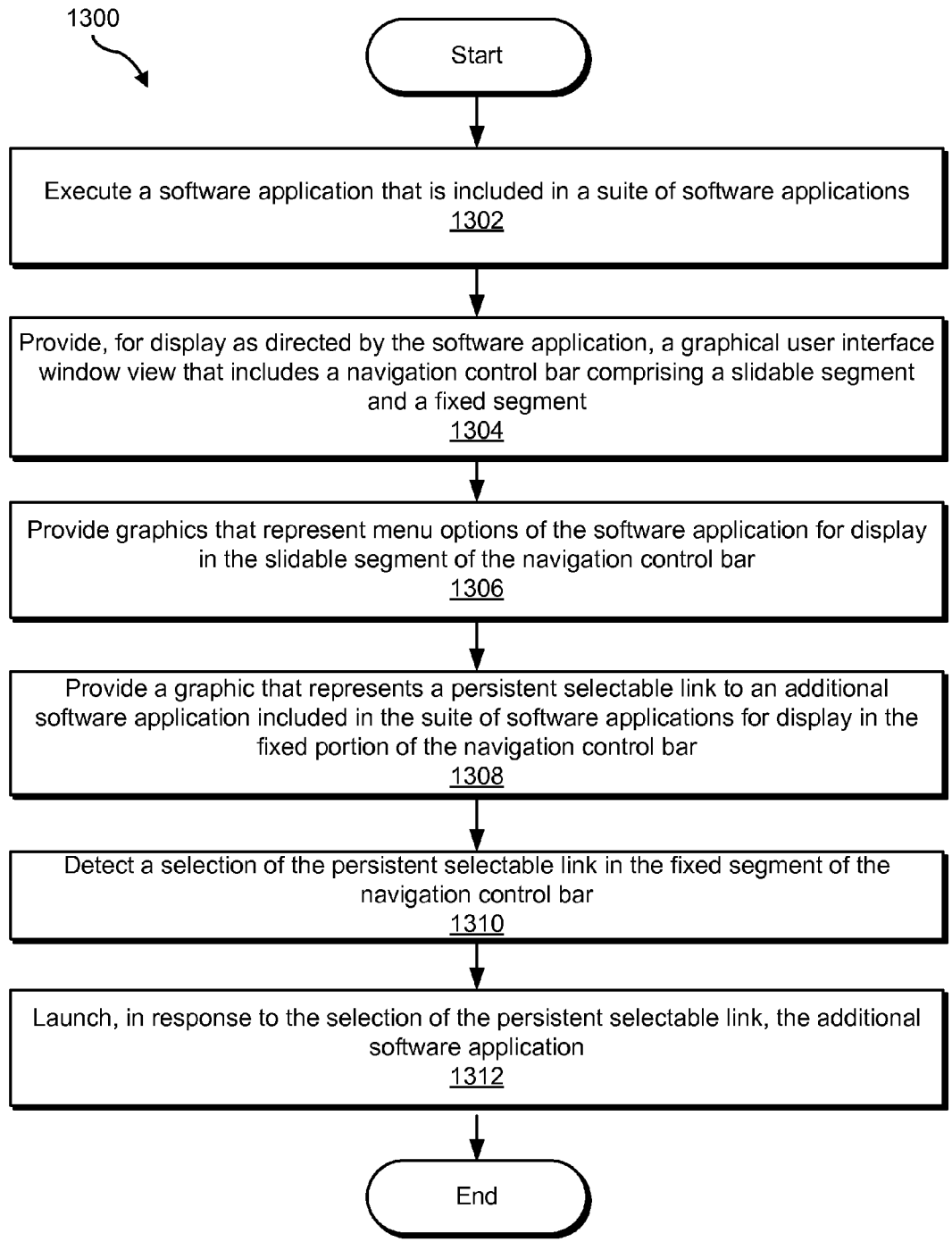

FIG. 13 illustrates another exemplary application user interface method 1300. While FIG. 13 illustrates exemplary steps according to one embodiment, other embodiments may omit, add to, reorder, combine, and/or modify any of the steps shown in FIG. 13. One or more of the steps shown in FIG. 13 may be performed by an application user interface module 104, a software application implementing an application user interface module 104, and/or a user computing device as directed by an application user interface module 104 and/or a software application implementing an application user interface module 104. In certain examples, one or more of the step shown in FIG. 13 may be repeated.

In step 1302, a user computing device executes a software application (e.g., a software application installed on the user computing device) that is included in a suite of software applications, such as described herein.

In step 1304, the user computing device provides, for display as directed by the software application, a GUI window view that includes a navigation control bar comprising a slidable segment and a fixed segment. Step 1304 may be performed in any of the ways described herein, and the GUI window view may include an exemplary GUI view illustrated herein.

In step 1306, the user computing device provides graphics that represent menu options of the software application for display in the slidable segment of the navigation control bar. For example, the user computing device may provide, for display in the slidable segment of the navigation control bar, a set of graphics that represent a set of menu options of an application menu associated with the software application (e.g., an application menu associated with a primary menu level of the software application).

In step 1308, the user computing device provides, for display in the fixed portion of the navigation control bar, a graphic that represents a persistent selectable link to an additional software application included in the suite of software applications. For example, the graphic may represent a persistent selectable link from a destination software application to an umbrella software application in a suite of software applications, such as described herein.

In step 1310, the user computing device detects a selection of the persistent selectable link in the fixed segment of the navigation control bar. For example, the user computing device may detect a user selection of the link.

In step 1312, the user computing device launches, in response to the selection of the persistent selectable link, the additional software application included in the suite of software applications, such as described herein.

One or more steps of method 1200 and one or more steps of method 1300 may be combined in other exemplary user interface methods.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 14:
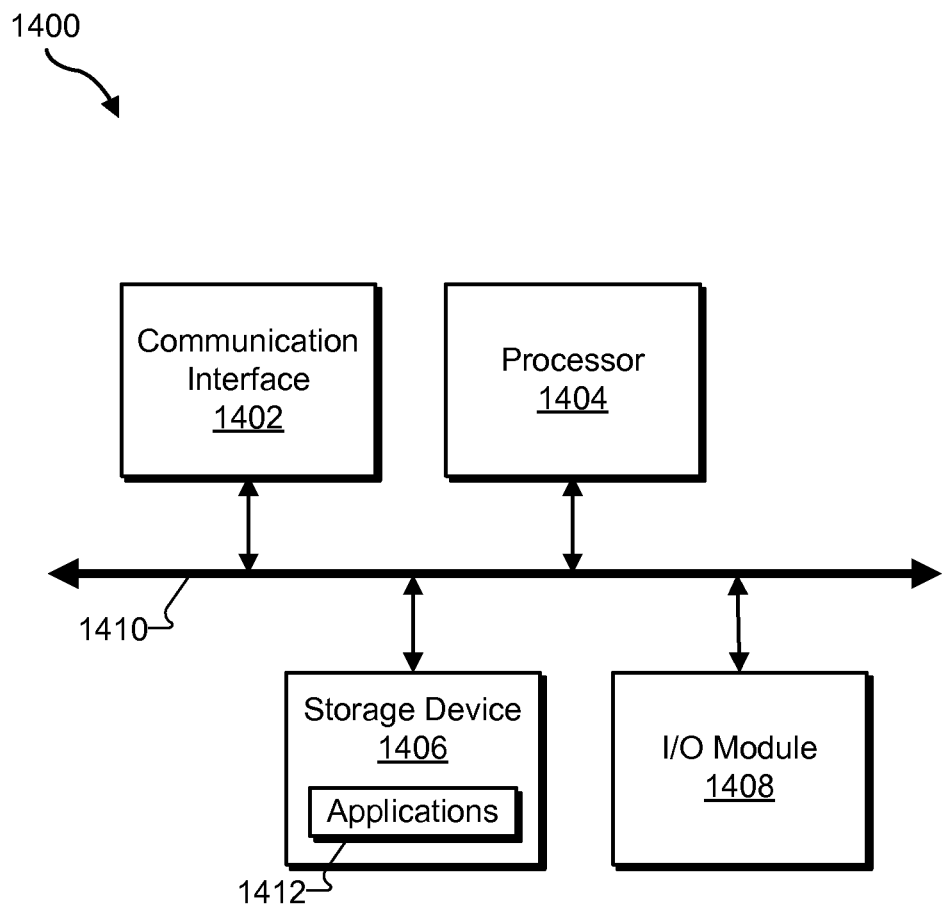
FIG. 14 illustrates an exemplary computing device according to principles described herein.

FIG. 14 illustrates an exemplary computing device 1400 that may be configured to perform one or more of the processes described herein. As shown in FIG. 14, computing device 1400 may include a communication interface 1402, a processor 1404, a storage device 1406, and an input/output ("I/O") module 1408 communicatively connected via a communication infrastructure 1410. While an exemplary computing device 1400 is shown in FIG. 14, the components illustrated in FIG. 14 are not intended to be limiting. Additional or alternative components may be used in other embodiments. Components of computing device 1400 shown in FIG. 14 will now be described in additional detail.

Communication interface 1402 may be configured to communicate with one or more computing devices. Examples of communication interface 1402 include, without limitation, a wired network interface (such as a network interface card), a wireless network interface (such as a wireless network interface card), a modem, an audio/video connection, and any other suitable interface.

Processor 1404 generally represents any type or form of processing unit capable of processing data or interpreting, executing, and/or directing execution of one or more of the instructions, processes, and/or operations described herein. Processor 1404 may execute and/or direct execution of operations as directed by one or more applications 1412 (which may include one or more software applications 102 included in suite 100) or other computer-executable instructions such as may be stored in storage device 1406 or another computer-readable medium.

Storage device 1406 may include one or more data storage media, devices, or configurations and may employ any type, form, and combination of data storage media and/or device. For example, storage device 1406 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1406. For example, data representative of one or more executable applications 1412 configured to direct processor 1404 to perform any of the operations described herein may be stored within storage device 1406. In some examples, data may be arranged in one or more databases residing within storage device 1406.

I/O module 1408 may be configured to receive user input and provide user output and may include any hardware, firmware, software, or combination thereof supportive of input and output capabilities. For example, I/O module 1408 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1408 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1408 is configured to provide graphical data to a display for presentation to a user. The graphical data may be representative of one or more GUI views and/or any other graphical content as may serve a particular implementation.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   executing, by a user computing device, one of a plurality of software applications included in a suite of software applications developed by a single service provider and installed on the user computing device, the suite of software applications comprising a destination software application, an additional destination software application, and an umbrella software application that provides links to the destination software application and the additional destination software application, the one of the plurality of software applications including an application menu hierarchy that comprises a primary menu level, a secondary menu level, and a tertiary menu level;
   providing, by the user computing device to display as directed by the one of the plurality of software applications, a graphical user interface window view that includes
      a first navigation control section in the form of a footer bar mapped to the primary menu level,
      a second navigation control section in the form of a header bar mapped to the secondary menu level, and
      a third navigation control section positioned between the footer bar and the header bar and mapped to the tertiary menu level;
   wherein the footer bar comprises
      a fixed segment that includes a persistent link selectable by a user to launch the umbrella software application included in the suite of software applications, wherein the persistent link is provided at a fixed position within the footer bar regardless of which software application included in the suite of software applications is currently executed by the user computing device, and
      a slidable segment that includes a first set of graphics that represent a first set of menu options associated with the one of the plurality of software applications and included in a first application menu associated with the primary menu level, each graphic included in the first set of graphics linearly aligned, within the footer bar, with the persistent link and with each other graphic included in the first set of graphics, the first set of graphics scrollable as a whole within the slidable segment;
   detecting, by the user computing device and within the footer bar, a user selection of a menu option included in the first set of menu options included in the first application menu associated with the primary menu level;
   providing, by the user computer device to display within the header bar and in response to the detecting of the user selection of the menu option, a second set of graphics that represent a second set of menu options included in a second application menu associated with the secondary menu level;
   detecting, by the user computing device, a user selection of the persistent link in the fixed segment of the footer bar;
   linking, by the computing device in response to the user selection of the persistent link and when the one of the plurality of software applications executing is the destination software application, the destination software application to the umbrella software application by launching the umbrella software application included in the suite of software applications; and
   providing, by the user computing device to display within the third navigation control section and in response to the detecting of the user selection of the persistent link, the graphical user interface window view that includes a first row of graphics representing a plurality of menu options associated with the destination software application included in the suite of software applications and a second row of graphics representing a plurality of menu options associated with the additional destination software application included in the suite of software applications.

2. The method of claim 1, wherein the second application menu is a submenu of the menu option selected within the footer bar.

3. The method of claim 1, further comprising providing, by the user computing device to display within the third navigation control section, a third set of graphics that represent a third set of menu options included in a third application menu associated with the tertiary menu level.

4. The method of claim 3, further comprising:
   detecting, by the user computing device and within the header bar, a selection of a menu option included in the second set of menu options included in the second application menu associated with the secondary menu level;
   wherein the providing of the third set of graphics that represent the third set of menu options included in the third application menu is performed in response to the detecting of the selection of the menu option within the header bar.

5. The method of claim 4, wherein the third application menu is a submenu of the menu option selected within the header bar.

6. The method of claim 1, wherein:
   the user computing device comprises a mobile user computing device; and
   the one of the plurality of software applications comprises one of a media manager application, a remote digital video recorder ("DVR") application, and a home control application.

7. The method of claim 1, embodied as computer-executable instructions on at least one non-transitory computer-readable medium.

8. The method of claim 1, further comprising:
detecting, by the user computing device, a user input associated with the slidable segment; and
scrolling, by the user computing device based on the detected user input, the first set of graphics such that the first set of graphics is replaced, within the slidable segment, with an additional set of graphics that represent an additional set of menu options associated with the destination software application.

9. The method of claim 1, wherein:
the plurality of menu options associated with the destination application include a first plurality of widgets that each provide access to at least one of a function and a menu of the destination application; and
the plurality of menu options associated with the additional destination application include a second plurality of widgets that each provide access to at least one of a function and a menu of the additional destination application.

10. A method comprising:
executing, by a user computing device, one of a plurality of software applications included in a suite of software applications developed by a single service provider and installed on the user computing device, wherein the suite of software applications comprises a destination software application, an additional destination software application, and an umbrella software application that provides links to the destination software application and the additional destination software application;
providing, by the user computing device to display as directed by the one of the plurality of software applications, a graphical user interface window view that includes a first navigation control bar comprising a slidable segment and a fixed segment, a second navigation control bar, and a navigation control section;
providing, by the user computing device to display within the slidable segment of the first navigation control bar, a set of graphics that represent a set of selectable menu options associated with the one of the plurality of software applications, the set of graphics scrollable as a whole within the slidable segment;
providing, by the user computing device to display within the fixed segment of the first navigation control bar, a graphic that represents a persistent link selectable by a user to launch the umbrella software application included in the suite of software applications, wherein the graphic that represents the persistent link is provided to display at a fixed position within the fixed segment regardless of which software application included in the suite of software applications is currently executed by the user computing device;
wherein the providing of the set of graphics that represent the set of selectable menu options associated with the one of the plurality of software applications includes linearly aligning, within the first navigation control bar, each graphic included in the set of graphics provided within the slidable segment with each other graphic included in the set of graphics provided within the slidable segment and with the graphic that represents the persistent link provided within the fixed segment;
detecting, by the user computing device and within the slidable segment, a user selection of a menu option included in the set of selectable menu options associated with the one of the plurality of software applications;
providing, by the user computer device to display within the second navigation control bar and in response to the detecting of the user selection of the menu option, an additional set of graphics that represent an additional set of selectable menu options associated with the one of the plurality of software applications;
detecting, by the user computing device, a user selection of the persistent link in the fixed segment of the first navigation control bar when the one of the plurality of software applications executing is the destination software application;
linking, by the user computing device and in response to the detecting of the user selection of the persistent link, the destination software application to the umbrella software application by launching the umbrella software application; and
providing, by the user computing device to display within the navigation control section in response to the detecting of the user selection of the persistent link, the graphical user interface window view that includes a first row of graphics representing a plurality of menu options associated with the destination software application and a second row of graphics representing a plurality of menu options associated with the additional destination software application.

11. The method of claim 10, wherein the first navigation control bar is a footer bar within the graphical user interface window view.

12. The method of claim 10, wherein the additional set of selectable menu options are submenu options of a selected menu option included in the set of selectable menu options represented by the set of graphics included in the slidable segment of the first navigation control bar.

13. The method of claim 10, wherein the second navigation control bar is a header bar within the graphical user interface window view.

14. The method of claim 10, wherein the navigation control section is positioned between the first navigation control bar and the second navigation control bar in the graphical user interface window view and includes a third set of graphics that represent a third set of selectable menu options associated with the one of the plurality of software applications.

15. The method of claim 14, wherein the third set of selectable menu options are submenu options of a selected menu option included in the additional set of selectable menu options represented by the additional set of graphics included in the second navigation control bar.

16. The method of claim 10, wherein:
the one of the plurality of software applications includes an application menu hierarchy that comprises a primary menu level, a secondary menu level, and a tertiary menu level;
the first navigation control bar is mapped to the primary menu level;
the second navigation control bar is mapped to the secondary menu level; and
the navigation control section positioned between the first navigation control bar and the second navigation control bar is mapped to the tertiary menu level.

17. The method of claim 10, embodied as computer-executable instructions on at least one non-transitory computer-readable medium.

18. A method comprising:
executing, by a user computing device, one of a plurality of software applications installed on the user computing device and including an application menu hierarchy that comprises a primary menu level, a secondary menu level, and a tertiary menu level, the one of the plurality of software applications included in a suite of software applications developed by a single service provider, wherein the suite of software applications comprises a destination software application, an additional destination software application, and an umbrella software application that provides links to the destination software application and the additional destination software application;

providing, by the user computing device to display as directed by the one of the plurality of software applications, a graphical user interface window view that includes
- a first navigation control section mapped to the primary menu level,
- a second navigation control section mapped to the secondary menu level, and
- a third navigation control section positioned between the first navigation control section and the second navigation control section and mapped to the tertiary menu level;

wherein the first navigation control section comprises:
- a slidable segment that includes a set of selectable menu options included in an application menu associated with the primary menu level of the one of the plurality of software applications, the set of selectable menu options scrollable as a whole within the slidable segment, and
- a fixed segment that includes a persistent link selectable by a user to launch the umbrella software application included in the suite of software applications, wherein the persistent link is provided at a fixed position within the fixed segment regardless of which software application included in the suite of software applications is currently executed by the user computing device, wherein each menu option included in the set of selectable menu options included within the slidable segment is linearly aligned with each other menu option included in the set of selectable menu options included within the slidable segment and with the persistent link included within the fixed segment within the first navigation control section;

detecting, by the user computing device and within the first navigation control section, a user selection of a menu option included in the first set of selectable menu options included in the first application menu associated with the primary menu level;

providing, by the user computer device to display within the second navigation control section and in response to the detecting of the user selection of the menu option, a second set of graphics that represent a second set of selectable menu options included in a second application menu associated with the secondary menu level;

detecting, by the user computing device, a user selection of the persistent link in the fixed segment of the first navigation control section when the one of the plurality of software applications executing is the destination software application;

linking, by the user computing device and in response to the detecting of the user selection of the persistent link, the destination software application to the umbrella software application by launching the umbrella software application; and providing, by the user computing device to display within the third navigation control section in response to the detecting of the user selection of the persistent link, a graphical user interface view that includes a first row of graphics representing a plurality of menu options associated with the destination software application and a second row of graphics representing a plurality of menu options associated with the additional destination software application.

19. A system comprising:
a handheld computing device having an integrated display screen;
a memory configured to store one or more sets of instructions; and
one or more processors communicatively coupled to the memory, the one or more processors configured to, based on the one or more sets of instructions, direct the handheld computing device to:
  execute, one of a plurality of software applications included in a suite of software applications developed by a single service provider and installed on the handheld computing device, the suite of software applications comprising a destination software application, an additional destination software application, and an umbrella software application that provides links to the destination software application and the additional destination software application, the one of the plurality of software applications including an application menu hierarchy that comprises a primary menu level, a secondary menu level, and a tertiary menu level;
  display, based on the one of the plurality of software applications, on the integrated display screen, a graphical user interface window view that includes
    a first navigation control section mapped to the primary menu level,
    a second navigation control section mapped to the secondary menu level, and
    a third navigation control section positioned between the first navigation control section and the second navigation control section and mapped to the tertiary menu level;
wherein the first navigation control section comprises
  a slidable segment that includes a first set of graphics that represent a first set of selectable menu options included in a first application menu associated with the primary menu level of the one of the plurality of software applications, the first set of graphics scrollable as a whole within the slidable segment, and
  a fixed segment that includes a graphic that represents a persistent link selectable by a user to launch the umbrella software application included in the suite of software applications, wherein the graphic that represents the persistent link is provided at a fixed position within the fixed segment regardless of which software application included in the suite of software applications is currently executed by the handheld computing device,
wherein each graphic included in the first set of graphics that represent the first set of selectable menu options included within the slidable segment is linearly aligned with each other graphic included in the first set of graphics that represent the first set of selectable menu options included within the slidable segment and with the graphic that represents the persistent link included within the fixed segment within the first navigation control section,
wherein the one or more processors are configured to, based on the one or more sets of instructions, further direct the handheld computing device to:

detect, within the first navigation control section, a user selection of a menu option included in the first set of selectable menu options included in the first application menu associated with the primary menu level;

display, within the second navigation control section, a second set of graphics that represent a second set of menu options included in a second application menu associated with the secondary menu level;

detect a user selection of the persistent link in the fixed segment of the first navigation control section;

link, in response to the user selection of the persistent link and when the one of the plurality of software applications executing is the destination software application, the destination software application to the umbrella software application by directing the handheld computer device to launch the umbrella software application included in the suite of software applications; and display, within the third navigation control section in response to the user selection of the persistent link, the graphical user interface window view that includes a first row of graphics representing a plurality of menu options associated with the destination software application included in the suite of software applications and a second row of graphics representing a plurality of menu options associated with the additional destination software application included in the suite of software applications.

* * * * *